May 2, 1961 H. A. K. SEEGELKEN 2,982,270
FUEL INJECTION FOR INTERNAL COMBUSTION ENGINES
Filed March 10, 1959 3 Sheets-Sheet 2

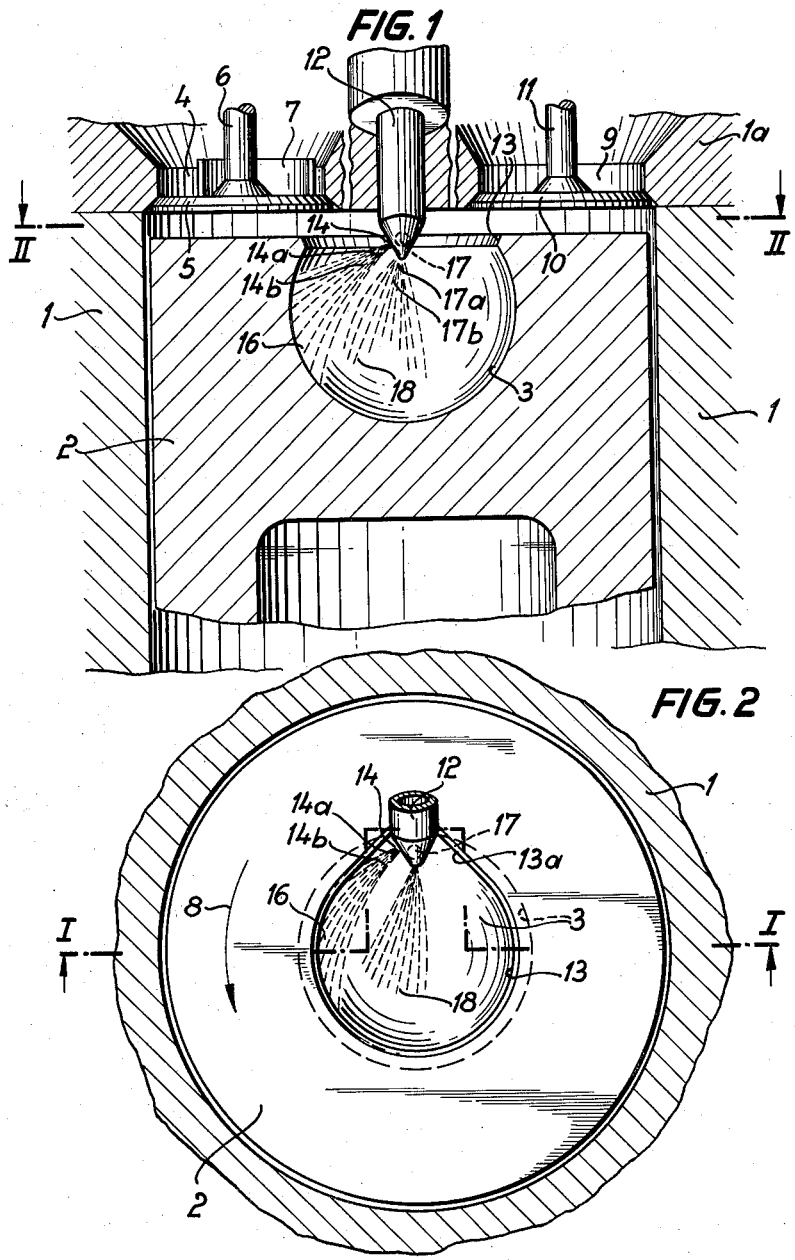

INVENTOR
HERMANN AUGUST KARL SEEGELKEN, DECEASED
By AUGUSTE INGEBORG SEEGELKEN,
ADMINISTRATRIX

Bailey, Stephen & Huettig
ATTORNEYS

May 2, 1961 H. A. K. SEEGELKEN 2,982,270
FUEL INJECTION FOR INTERNAL COMBUSTION ENGINES
Filed March 10, 1959 3 Sheets-Sheet 3

INVENTOR
HERMANN AUGUST KARL SEEGELKEN, DECEASED
By AUGUSTE INGEBORG SEEGELKEN,
ADMINISTRATRIX

ATTORNEYS

2,982,270
FUEL INJECTION FOR INTERNAL COMBUSTION ENGINES

Hermann August Karl Seegelken, deceased, late of Nurnberg, Germany, by Auguste Ingeborg Seegelken, executor, Nurnberg, Germany, assignor to Maschinenfabrik, Augsburg-Nurnberg, A.G., Nurnberg, Germany
Filed Mar. 10, 1959, Ser. No. 798,390
Claims priority, application Germany Oct. 9, 1954
16 Claims. (Cl. 123—32)

This invention relates to fuel injection for internal combustion engines. In particular, the invention is directed to the formation of a fuel and air mixture in the combustion chamber of a self-ignition internal combustion engine.

In the copending application of Meurer et al., Serial No. 480,432, filed January 7, 1955, now Patent No. 2,907,308, issued October 6, 1959, for "Operation of Internal Combustion Engines," a method of forming a fuel-air mixture in a self-igniting internal combustion engine is disclosed in which a combustion chamber is formed in the piston, and injection nozzles are eccentrically and obliquely mounted in the cylinder head. The fuel is applied to the wall of the combustion chamber as a thin film, and the intake air is given a rotary motion in the cylinder and combustion chamber so that the fuel is gradually wiped off the combustion chamber wall in the form of a vapor mixed with the air, and then burned. This method is primarily concerned in applying the fuel in the same direction as that of the rotation of the air in the combustion chamber.

The object of this invention is to improve upon the formation of the air-fuel mixture by varying the relation between the direction of the application of the fuel to the wall of the combustion chamber with regard to the direction of the air swirl to deposit a thin quickly vaporizable film of fuel over as much as possible of the surface area of the combustion chamber wall.

In general, these objects are achieved by, in addition to the use of the fuel jet in the same direction as the air swirl, also, the use of a second fuel jet applied to the wall of the combustion chamber in a direction which is perpendicular to and transverse or perpendicularly across that of the air swirl. This additional application of the fuel on the wall of the combustion chamber, as compared to the directing of the fuel only in the direction of the air swirl, has the advantage that, due to the action of the air swirl upon the second fuel jet, a large area of the wall of the combustion chamber is wetted with a film of fuel. The larger the wetted area, the faster will proceed the formation of the fuel-air mixture, and consequently the combustion also. The area wetted by fuel is particularly large, and consequently the effect of the formation of the fuel-air mixture is very favorable if a plurality of fuel jets are directed upon the wall in a direction differing from that of the air swirl as described above. For example, a third fuel jet can be directed directly opposed to the direction of the air swirl and impinged upon the combustion chamber wall.

This is a continuation-in-part of my now abandoned copending application Serial No. 539,599, filed October 10, 1955, for "Fuel Injection for Internal Combustion Engines."

The means by which the objects of the invention are obtained are described more fully with reference to the accompanying drawings, in which:

Figure 1 is a diagrammatical, cross-sectional view through a piston, on the line I—I of Figure 2, with the engine nozzle shown in perspective;

Figure 2 is a cross-sectional view on the line II—II of Figure 1;

Figure 3:
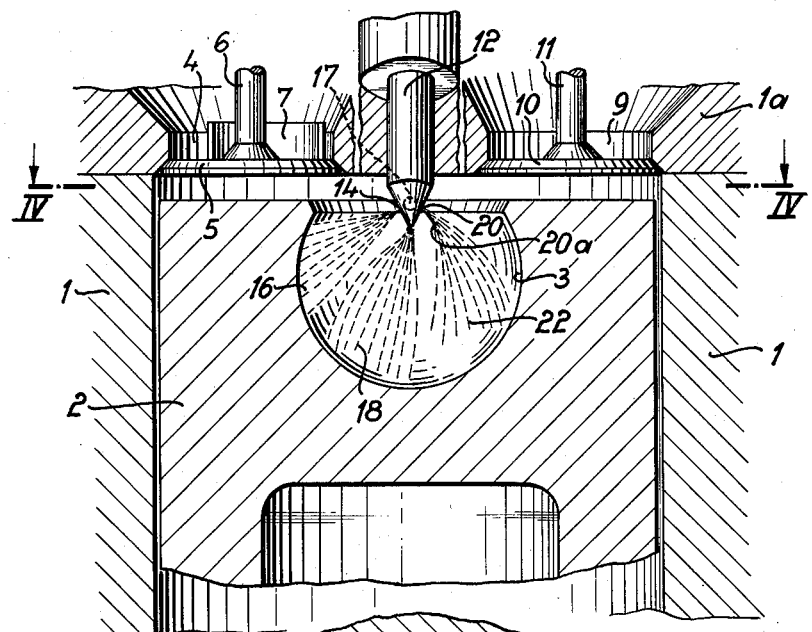
Figure 4:
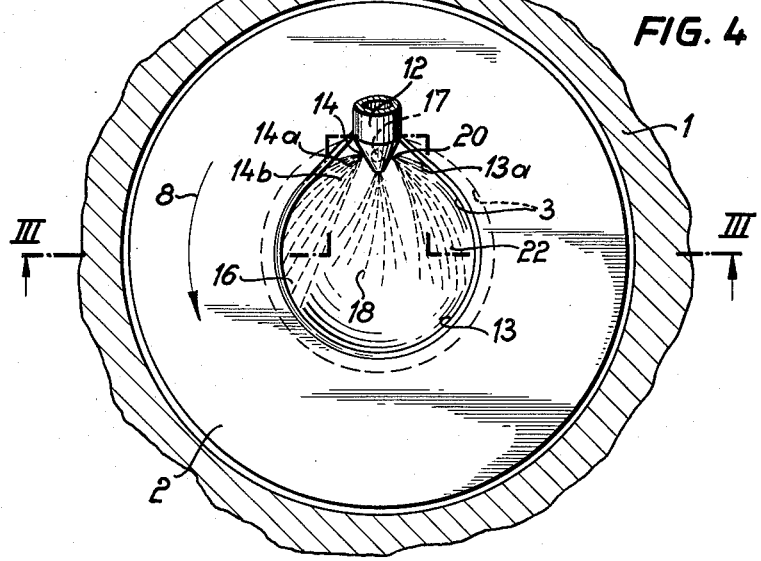
Figure 5:
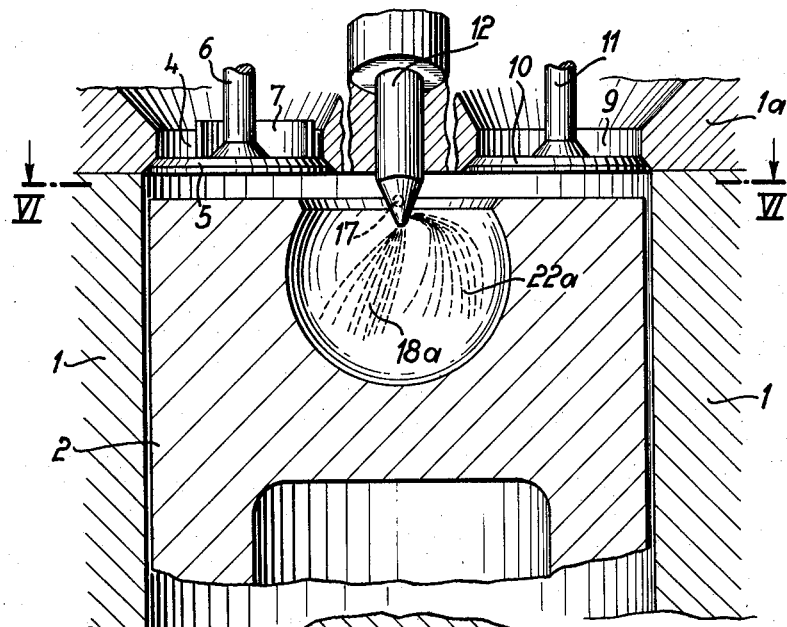
Figure 6:
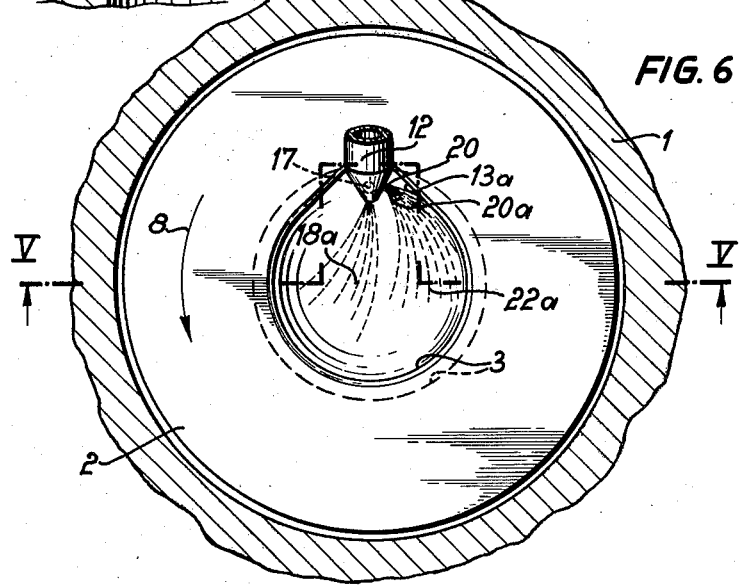

Figures 3 and 4 are views similar to Figures 1 and 2, taken on section lines III—III and IV—IV, respectively, of a modification; and Figures 5 and 6 are likewise similar views, taken on section lines V—V and VI—VI, respectively, of a further modification.

In Figures 1 and 2, cylinder 1 contains a piston 2. The piston has a combustion chamber 3 whose axis coincides with the cylinder axis. An air inlet channel 4 is opened and closed by a valve head 5 with stem 6 and a mask 7 which functions to give the air entering the cylinder a swirling motion in the direction of arrow 8, Figure 2. The exhaust channel 9 is in the usual manner closed by a valve head 10 with stem 11.

Injection nozzle 12 has two outlet bores or orifices. It is mounted in the cylinder head 1a so that it projects into the combustion chamber 3 from above at an inclination of about 45° when the piston is in its top dead center position as shown. While the combustion chamber 3 has an equatorial diameter larger than the diameter of opening 13. Nozzle 12 projects through 13a, so that the end of the nozzle comes very close to combustion chamber wall 3 at top dead center. Neither of the two orifices 14 and 17 are positioned at the point of nozzle 12. From orifice 14, a compact fuel stream 14a is discharged in the same direction as the air swirl, or at least in a direction having a component in the direction of the air swirl, almost tangentially to the combustion chamber wall 3 at approximately point 14b. Since orifice 14 during the injection is very close to wall 3 and is pointed to make the stream path 14a very short, only a minor part of the fuel is split off from the fuel stream and atomized, so that the major portion of the fuel stream forms a film 16 on the wall. The second orifice 17 is pointed so that the stream 17a is discharged perpendicularly across the direction of the air swirl and somewhat downwardly of chamber 3 to strike the wall tangentially, likewise at the shortest distance, approximately at point 17b to form a film 18 on this wall. The air which rotates in the cylinder in the direction of arrow 8 enters the combustion chamber 3 mainly in the center of opening 13 and swirls with great velocity around the cylinder axis. In this process, the swirling air presses the fuel streams 14a and 17a against the wall of combustion chamber 3 and spreads the fuel which has reached the wall into films 16 and 18 which are as thin as possible.

The embodiment shown in Figures 3 and 4 corresponds essentially to Figures 1 and 2, but with an additional orifice 20 in nozzle 12 from which a fuel stream 20a is discharged to form a film 22. Stream 20a is pointed opposed to the direction of the air swirl. As shown in the drawing, the air swirling in the direction of arrow 8 spreads the fuel on the chamber wall, so that film 22 is deposited on an area other than the films 18 and 16. Nevertheless, all three films wet different parts of the chamber wall, so that the total wetted surface is larger than in Figures 1 and 2.

In Figures 5 and 6, only nozzle orifices are provided which form films 18a and 22a approximately corresponding to films 18 and 22 of Figures 3 and 4. The film 16 of Figures 3 and 4 is in this case not formed since the corresponding nozzle orifice is lacking. Fuel streams perpendicular opposed to the air swirl inherently have a larger portion of the fuel atomized before it reaches the wall, as compared to fuel streams in the same direction as the air swirl. Therefore, in this arrangement, less fuel than in Figures 1 to 4 reaches the wall, so that it is used to facilitate cold starting of the engine. A greater quantity of fuel is to be atomized in the air before reaching the wall, as compared to the construction shown in Figures 1 to 4.

Having now described the means by which the objects of the invention are obtained,

It is claimed:

1. A method of forming a fuel-air mixture in a compression ignition solid injection engine, comprising the steps of introducing air into the engine cylinder, compressing the air into a combustion chamber and imparting to the air a swirling motion about the axis of the combustion chamber, injecting at least one compact solid stream of liquid fuel generally tangentially upon the wall of the combustion chamber generally tangentially to the air swirl and in a direction having a component in the direction of the swirling air and from a point close to the point of contact of the stream on said wall to minimize atomization of the fuel in said stream and promote deposition of liquid fuel on the wall of the combustion chamber in the form of a film, and injecting at least another compact solid stream of liquid fuel generally in the same manner as the first stream but in a direction without a component in the direction of the swirling air and without substantial atomization of the fuel to deposit at least another film on the wall of the combustion chamber, and then mixing fuel vaporized from all films on the combustion chamber wall with said swirling air to form the air-fuel mixture.

2. A method as in claim 1, comprising injecting said another stream of liquid fuel perpendicular to the direction of the swirling air.

3. A method as in claim 1, comprising injecting said another stream of liquid fuel in a direction opposed to the direction of the swirling air.

4. A method as in claim 1, comprising injecting said another stream of liquid fuel perpendicular to the direction of the swirling air, and injecting an additional stream of liquid fuel in a direction opposed to the direction of the swirling air.

5. A method for forming a fuel-air mixture in a compression ignition solid injection engine, comprising the steps of introducing air into the engine cylinder and simultaneously imparting to the introduced air a swirling motion about the axis of the cylinder, compressing such charge into a combustion chamber approximately coaxial with the cylinder and of reduced diameter with respect to the diameter of the cylinder to increase the angular velocity of air swirl, and then injecting at least one compact solid stream of liquid fuel generally tangentially upon the wall of the combustion chamber and generally tangentially to the air swirl in a direction having a component in the direction of swirling air and from a point close to the point of contact of the stream on said wall to minimize atomization of the fuel in said stream and promote deposition of liquid fuel on the wall of the combustion chamber in the form of a film, and injecting at least a second compact solid stream of liquid fuel generally in the same manner but in a direction without any component in the direction of the swirling air and without substantial atomization of the fuel to deposit at least another film on the wall of the combustion chamber, and then mixing fuel vaporized from all films on the combustion chamber wall with said air swirl to form the air-fuel mixture.

6. A method as in claim 5, comprising injecting said another stream of liquid fuel perpendicularly to the direction of the swirling air.

7. A method as in claim 5, comprising injecting said another stream of liquid fuel in a direction opposed to the direction of the swirling air.

8. A method as in claim 5, comprising injecting said another stream of liquid fuel perpendicularly to the direction of the swirling air, and injecting a third stream of liquid fuel in a direction opposed to the direction of the swirling air.

9. In a compression ignition solid injection engine, an intake valve for introducing air into the engine cylinder, a combustion chamber and means for imparting to the air a swirling motion about the axis of the combustion chamber, an injection nozzle having means for injecting a compact solid stream of liquid fuel and positioned for injecting the fuel stream generally tangentially upon the wall of the combustion chamber and generally tangentially to the air swirl in a direction having a component in the direction of the swirling air and from a point close to the point of contact of the stream on said wall, and nozzle means for injecting at least another compact solid stream of liquid fuel upon the combustion chamber wall generally in the same manner as the first stream but in a direction without any component in the direction of the swirling air.

10. In an engine as in claim 9, said nozzle means comprising an injection nozzle having at least two orifices, one of which is pointed to inject a stream of liquid fuel perpendicular to the direction of the swirling air, and the other of which is pointed to inject a stream of liquid fuel in the direction of the swirling air.

11. In an engine as in claim 9, said nozzle means comprising an injection nozzle having at least one orifice pointed to inject a stream of liquid fuel in a direction opposed to the direction of the swirling air, and having at least another orifice pointed to inject a stream of liquid fuel in the direction of the swirling air.

12. In an engine as in claim 9, said nozzle means comprising an injection nozzle having three bores, one of which is pointed to inject a stream of liquid fuel in the direction of swirling air, a second of which is pointed to inject a second stream of liquid fuel perpendicularly to the direction of the swirling air, and the third of which is pointed to inject a third stream of liquid fuel in a direction opposed to the direction of the swirling air.

13. In a compression ignition solid injection engine having a cylinder with a piston therein, an intake valve for introducing air into the engine cylinder and including means for simultaneously imparting to the introduced air a swirling motion about the axis of the cylinder, said piston compressing the air into a combustion chamber approximately coaxial with the cylinder and of reduced diameter with respect to the diameter of the cylinder to increase the angular velocity of air swirl, nozzle means for injecting a compact solid stream of liquid fuel generally tangentially upon the wall of the combustion chamber generally tangentially to the air swirl and in a direction having a component in the direction of the swirling air and from a point close to the point of contact of the stream on said wall to minimize atomization of the fuel and promote deposition of liquid fuel on said wall in the form of a film, and additional nozzle means for injecting at least another compact solid stream of liquid fuel generally in the same manner as the first stream but in a direction without any component in the direction of the swirling air and without substantial atomization of the fuel to deposit at least an additional film on said wall.

14. In an engine as in claim 13, said injection nozzle means having at least two orifices, one of which is pointed to inject a stream of liquid fuel perpendicularly to the direction of the swirling air, and the other of which is pointed to inject a stream of liquid fuel in the direction of the swirling air.

15. In an engine as is claim 13, said injection nozzle means having another orifice pointed to inject a stream of liquid fuel in a direction opposed to the direction of the swirling air.

16. In an engine as in claim 13, said injection nozzle means comprising an injection nozzle for injecting at least one stream of liquid fuel perpendicularly to the direction of the swirling air and for injecting another stream of liquid fuel in a direction opposed to the direction of the swirling air.

References Cited in the file of this patent

UNITED STATES PATENTS 2,837,067   Meurer _____ June 3, 1958